Aug. 24, 1943.  C. S. TURNER  2,327,750
SUPERHEATING FLASH BOILER
Filed Aug. 2, 1940  7 Sheets-Sheet 1
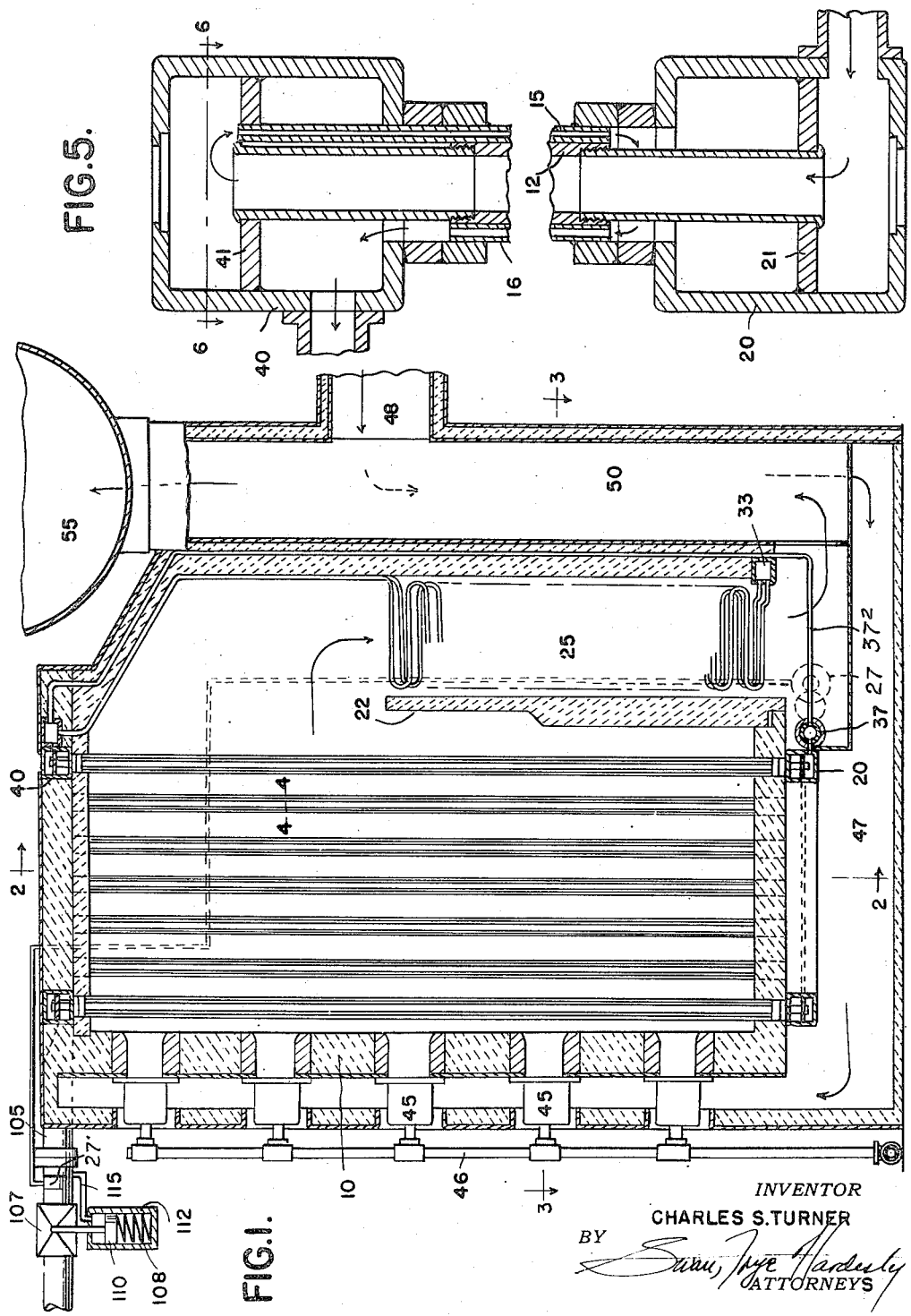
INVENTOR
CHARLES S. TURNER
BY
ATTORNEYS Aug. 24, 1943.                C. S. TURNER                    2,327,750
                         SUPERHEATING FLASH BOILER
                    Filed Aug. 2, 1940          7 Sheets-Sheet 2

INVENTOR
CHARLES S. TURNER
BY
ATTORNEYS

Aug. 24, 1943.                 C. S. TURNER                 2,327,750
                        SUPERHEATING FLASH BOILER
                        Filed Aug. 2, 1940          7 Sheets-Sheet 3
FIG.3.
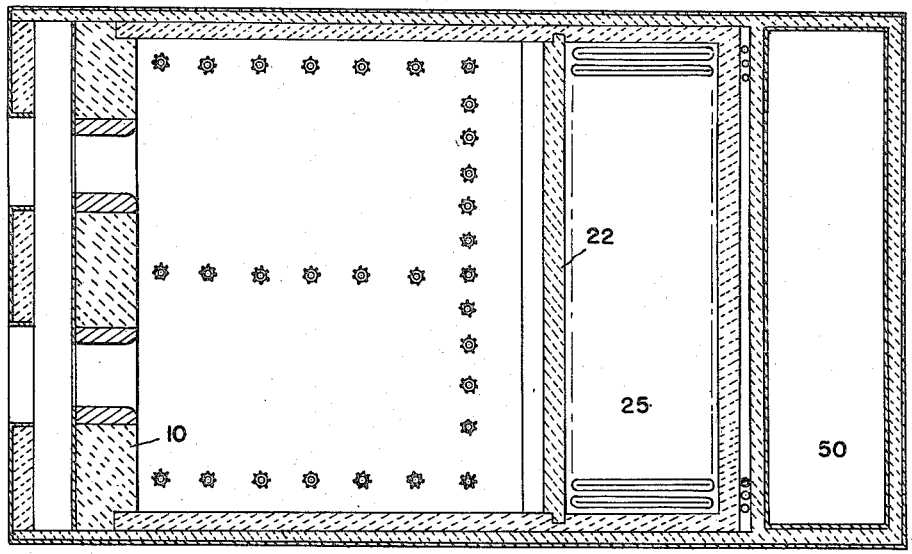
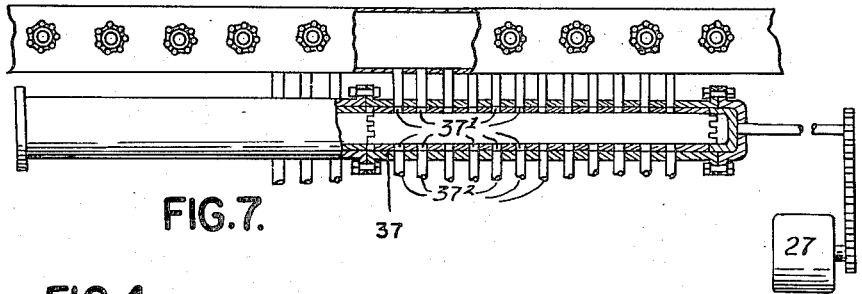
FIG.7.
FIG.4.
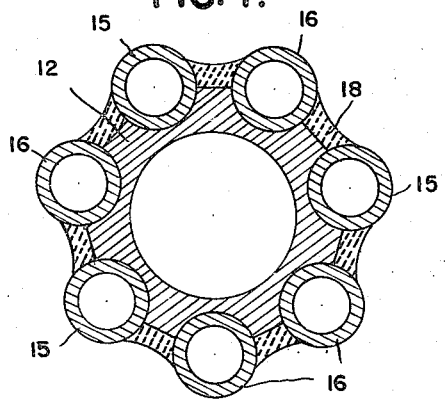
FIG.6.
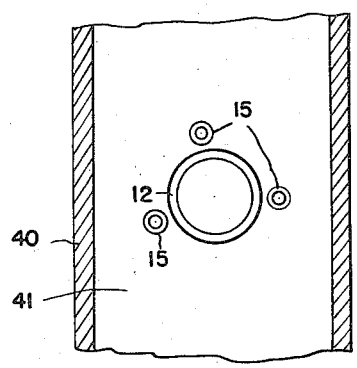
INVENTOR
CHARLES S. TURNER
BY
ATTORNEYS

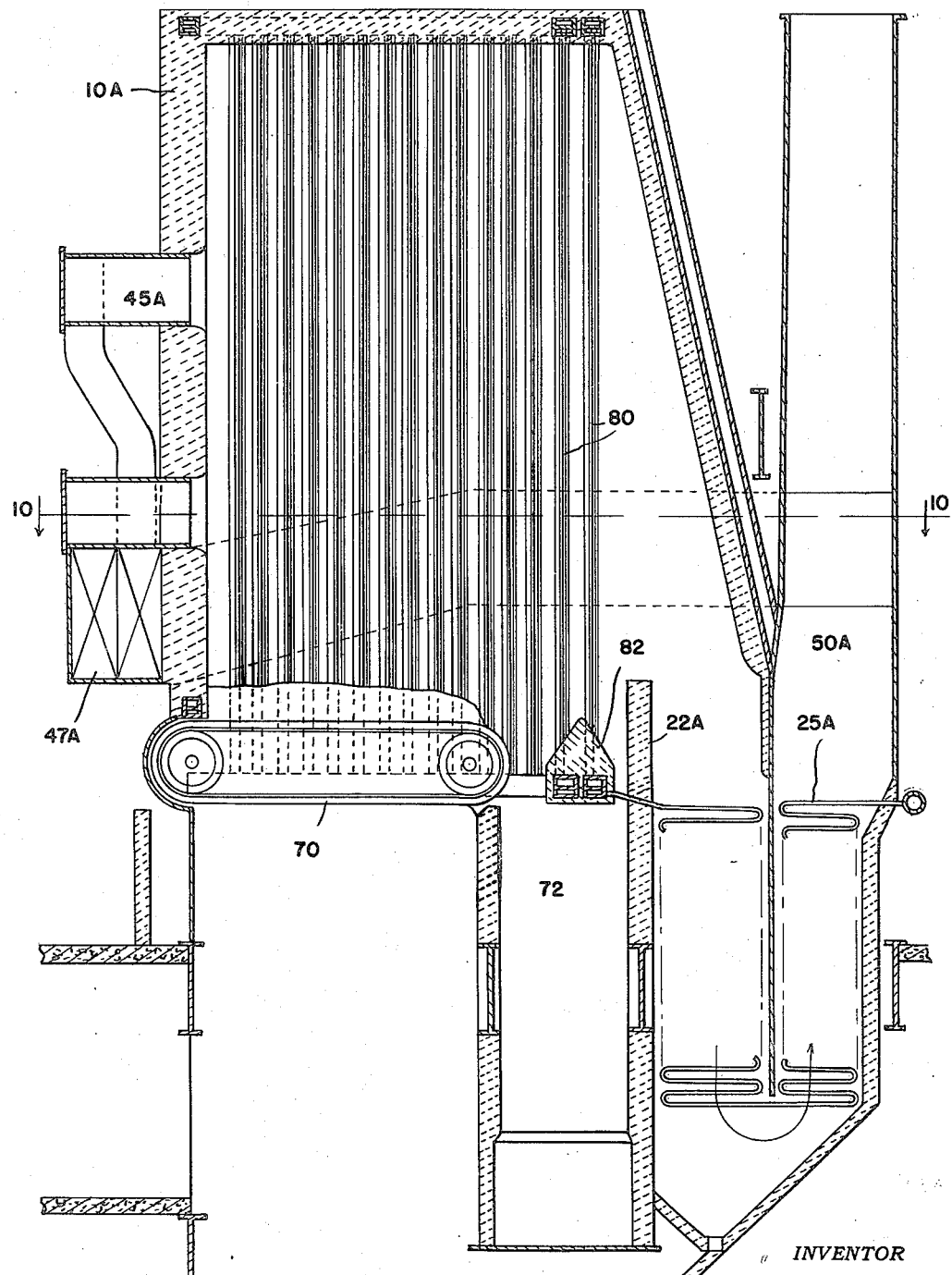

Aug. 24, 1943.   C. S. TURNER   2,327,750
SUPERHEATING FLASH BOILER
Filed Aug. 2, 1940   7 Sheets-Sheet 5
FIG.10.
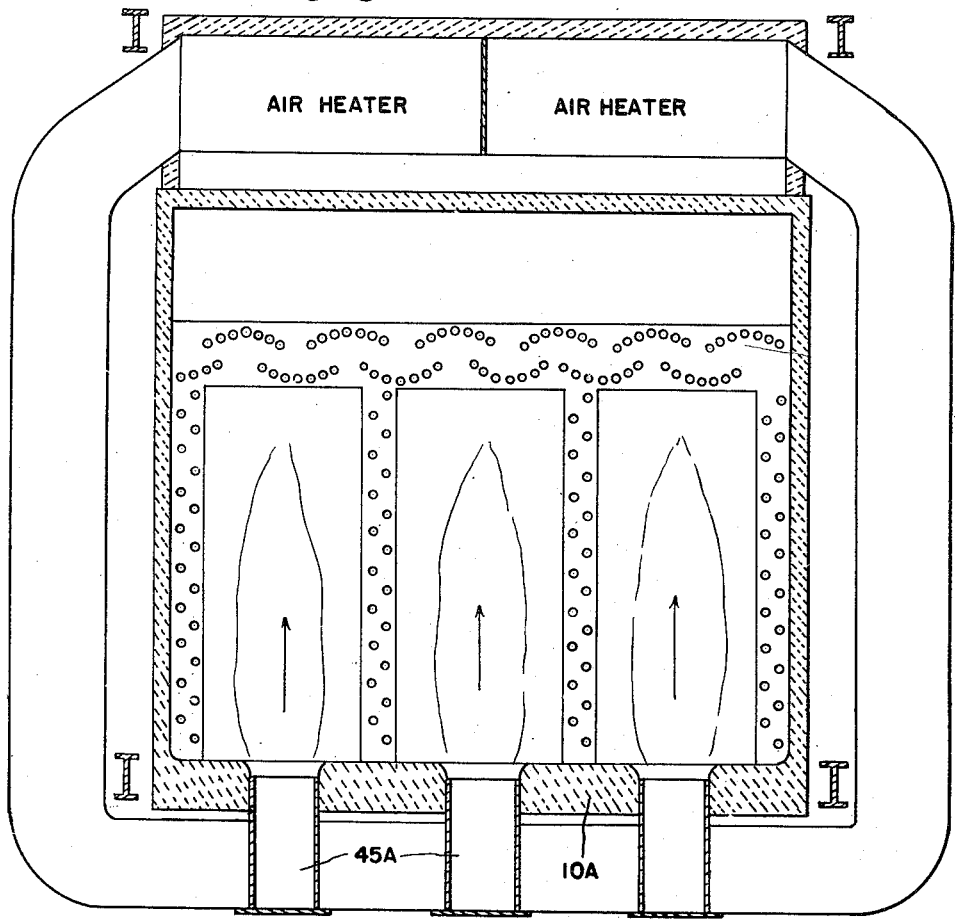
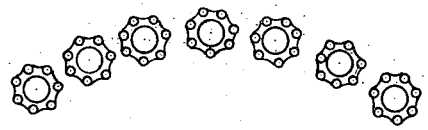
FIG.11.
INVENTOR
CHARLES S. TURNER
BY
ATTORNEYS Aug. 24, 1943.   C. S. TURNER   2,327,750
SUPERHEATING FLASH BOILER
Filed Aug. 2, 1940   7 Sheets-Sheet 7

INVENTOR
CHARLES S. TURNER
BY
ATTORNEYS

Patented Aug. 24, 1943

2,327,750

UNITED STATES PATENT OFFICE 2,327,750

SUPERHEATING FLASH BOILER

Charles S. Turner, Detroit, Mich., assignor to The Detroit Edison Company, Detroit, Mich., a corporation of New York Application August 2, 1940, Serial No. 349,660

10 Claims. (Cl. 122—235)

This invention relates to heat absorbing apparatus, particularly to radiant steam boilers and superheaters of that class wherein heat absorbing elements are directly exposed to the flaming gases which comprise the source of radiant energy. Where designed for high rates of heat absorption, it has been common to line the combustion chambers of such boilers with so-called "water walls," formed of water tubes spaced around the edges of the combustion space in such manner as to absorb radiant energy emanating from the flaming gases which flow through the chamber. In considering the limitations of such apparatus, I have come to the conclusion that its relative inefficiency in the absorption of radiant heat is due largely to the opacity of the flame itself. In large boilers where the combustion space is many feet across, the radiation from the flame in the central portion of such space is unable to penetrate the flaming gases closer to such walls, and so cannot reach the conventional water walls located around the borders of the chamber. This results in a sharp temperature drop, as the water walls are approached from a point in the chamber about three feet in, all points within the chamber more than three feet (approximately) from the walls being at an elevated temperature.

In an effort to increase the radiant heat absorption, the combustion chambers and their surrounding water walls, in commercial boilers, have been built higher and higher, until at the present time heights of sixty feet are common. It has been hoped that turbulence would carry all parts of the gases, at some time during their upward course, sufficiently close to the water walls to allow delivery of a larger proportion of the generated radiant heat to the water. Such efforts have met with virtual failure. The gases in the center tend to remain in the center, and vice versa, no matter how far the chamber is extended, and the gases are delivered from the combustion chamber without effective absorption of the radiant heat from any but the gases around the edge.

Of course the combustion must be as complete as possible within the combustion chamber, so that only hot gases are passed through the convection tubes, which are arranged for direct impingement, and it is not practicable to allow direct impingement of flame against any of the tubes, since their cooling effect would result in incomplete combustion. The radiant energy which is not absorbed by the water walls, in a conventional boiler, expends itself in heating the gases of combustion, from which the heat must in turn be absorbed by convection tubes. Since much greater heating surface is required to absorb a given amount of heat by convection than by radiation, a great economy could be effected if a greater proportion of the radiant heat could be directly absorbed from the flaming gases in the combustion chamber, without, however, allowing such cooling of any portion of the flaming matter as would result in incomplete combustion.

With the foregoing considerations in mind, the present invention aims to provide means for absorbing a greater proportion of radiant heat directly from the flaming gases in a combustion chamber than has heretofore been possible without interfering with complete combustion, thereby reducing the combustion chamber temperatures, and reducing also the amount of work necessary to be done, and the amount of heat absorbing surface required, in the convection portion of the boiler.

A related object is to secure the desired results by means of a tubing arrangement which provides for absorption of radiant energy at a plurality of zones throughout the combustion chamber, the zones being so located as to prevent self-shielding of the tubing by the flame due to its own opacity, while yet reducing to a minimum direct impingement of the flame against the heat absorbing elements and preventing such cooling as would result in incomplete combustion.

Another object is to provide a highly efficient, drumless, superheating flash boiler, so designed that the output steam temperature is accurately and constantly regulable, yet there is no danger of either running dry or of drawing wet steam or water from the steam delivery pipe in event of a sudden heavy demand.

Another object is to provide a boiler of the character stated which may be assembled in units of standardized sizes, and which after construction may easily be enlarged or reduced in size by adding or subtracting one or more of such standardized units.

A still further object is to provide such standardized units which correspond in proportions to the empirical characteristics resulting from the above noted self-shielding action of flame—that is, to the distance which radiant heat generated in the interior of a body of flame is projectable through the surrounding flame. It is also an object to arrange such units, comprising the radiant heat absorbing elements, in rows, parallel to the paths of travel of the flame and gases, providing lanes through which the flaming gases pass, the lanes being so proportioned as to allow maximum transfer of radiant heat to the absorbing elements, with minimum self-interference by the flame, without allowing the gases to be cooled below the ignition temperature.

Another object is the provision of such a boiler all of the tubes and units of which may be conveniently cleaned and drawn.

Still another object of the invention is to eliminate entirely the use of convection surface from the steam generating portions of a boiler, thereby doing away with the necessity for circulation in the boiler, and making feasible the aforementioned elimination of water drums and standing water levels in the conventional sense.

A further object relates to the provision of an improved slag screen construction, especially although not exclusively adapted to be used in conjunction with a radiant boiler provided with flame-lanes in accordance with the teachings of the present disclosure.

Another object believed worthy of particular mention is to provide such a radiant boiler having its combustion space divided into zones to form the aforementioned lanes for flame travel, and to control the supply of air to the fire in a novel manner allowing its regulation in distinct zones and permitting zoned feeding of air over the fire as well as through it.

Other objects and advantages will be apparent from the following description, wherein reference is made to the accompanying drawings illustrating preferred embodiments of my invention and wherein similar reference numerals designate similar parts throughout the several views.

In the drawings:

Figure 1 is a central vertical section of a combined radiant boiler and superheater construction incorporating the principles of this invention.

Figure 3 is a horizontal section taken substantially on the line 3—3 of Figure 1, and looking in the direction of the arrows.

Figure 4 is a cross sectional view of one of the generating and superheating units.

Figure 5 is a longitudinal cross-sectional view of one of the combined generating and superheating units, and of the upper and lower headers to which it is attached, the tubing being centrally broken away.

Figure 6 is a cross section taken substantially on the line 6—6 of Figure 5, and looking in the direction of the arrows.

Figure 7 is a detailed view, partly in elevation and partly in section, taken substantially on the line 7—7 of Figure 1, and looking in the direction of the arrows.

Figure 9 is a view similar to Figure 1 showing a somewhat modified construction.

Figure 10 is a horizontal sectional plan view, taken substantially on the line 10—10 of Figure 9, and looking in the direction of the arrows.

Figure 11 is a sectional detail on a larger scale, taken substantially on the line 11—11 of Figure 9, and looking in the direction of the arrows.

Figure 8:
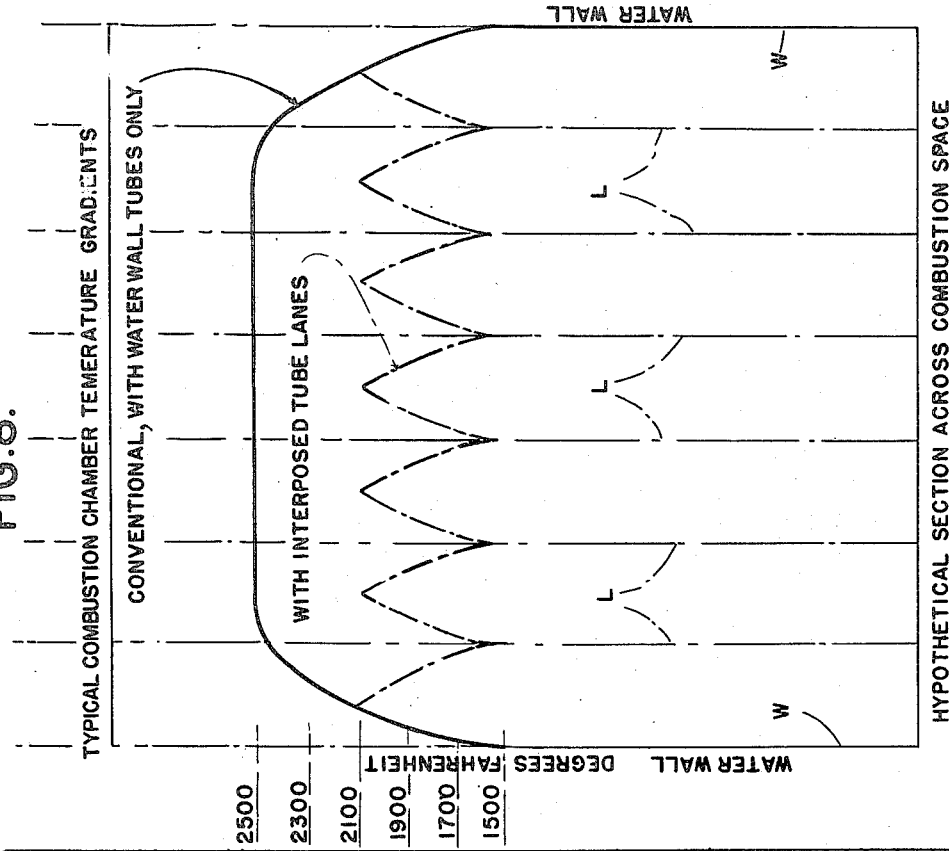
Figure 8 is a diagram showing the relative temperature effects achieved in a combustion chamber when constructed with water walls in the conventional manner and, comparatively, when supplied with radiant heat absorbing means constructed and arranged in accordance with the present invention.
Figure 2:
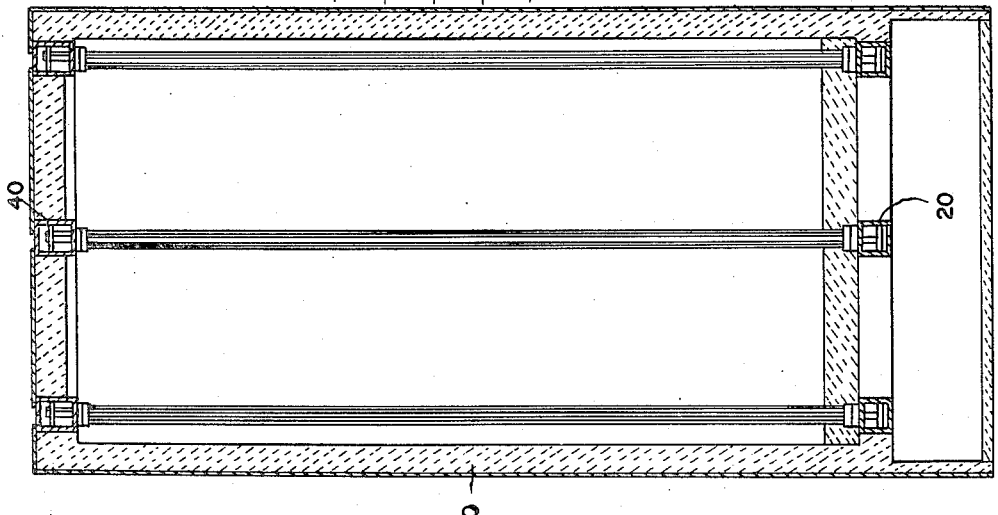
Figure 2 is a vertical section taken at right angles to Figure 1, substantially as indicated by the line and arrows 2—2 of Figure 1.

Referring now to the drawings:

The shape and details of construction of the furnace in which the invention is incorporated are subject to wide variation, although certain fundamental principles are always applied. In the embodiment shown in Figures 1 to 7 inclusive, the furnace comprises a substantially rectangular housing, generally designated 10, the walls of which may be of fire-brick or other suitable material. The heating means is shown as a plurality of oil burners 45, installed in the front wall, while gases of combustion are led through flues at the rear to the stack 55.

The heating surface consists of a plurality of vertically disposed multi-tube units, each unit comprising independent steam and water passages. Their construction corresponds generally to the water-regulated superheating units disclosed in my earlier patents, Nos. 2,000,906 and 2,119,451, issued May 14, 1935, and May 31, 1938, respectively.

As best shown in Figures 4 and 5, each such unit consists of a central water tube 12 having a longitudinally fluted or channeled exterior, steam tubes 15, 16 being laid in the channels and welded as at 18 to the peaks of the flutes between the channels, each weld also serving to unite two adjacent steam tubes. The channels and tubes 15, 16 may be helically coiled about the central tube, to equalize radiant heat impingement upon the tubes 15. The central conduit 12 constitutes the saturated steam generating portion, while the outer tubes 15, 16 comprises the superheating surface.

The generating and superheating units are arranged in rows, supported at their upper and lower extremities by header assemblies 20, 40. The bottom header assembly is longitudinally divided into upper and lower sections by a diaphragm 21, the space below which handles the feed water supply to the tubes 12, while the space above the diaphragm transfers steam from tubes 15 to tubes 16. The upper header assembly 40 is also horizontally divided by a diaphragm 41, the space below the diaphragm acting as an offtake header for the superheated steam emanating from tubes 16, while the space above the diaphragm acts as a transfer header, delivering saturated steam from tubes 12 to 15. Each of the central tubes 12 extends from the lower section of the bottom header to the upper section of the top header; each of the tubes 15 extends from the upper section of the bottom header to the lower section of the top header, while tubes 16 extend from the upper section of the bottom header to the lower section of the top header.

The feed water enters the bottom header section from the economizer 25, through the connecting pipes 23, and passes upwardly through the tubes 12, in which it is converted into saturated steam. Superheating action takes place in two stages, the first occurring while the steam is passing downwardly through the tubes 15, and the second occurring while it passes upwardly through the tubes 16, the transfer between passes occurring in the upper section of the bottom header. The fully superheated steam is delivered to the lower section of the top header, from which it may be conducted to any desired destination by means of a steam pipe 55.

The integrated generating-superheating units are arranged in rows in the combustion space, which rows are parallel to the direction of flame travel. Oil burners 45 are shown arranged in the front wall of the furnace in such positions as to project the flame between the rows, as best shown in Figure 3. The distance between the rows preferably does not exceed four feet, in order that radiation from the innermost portions of the flame, most remote from the tubes, may find its way to the tubes and act upon the water therein. I have found that if materially greater spacing is used, the opacity of the flame itself prevents radiant energy generated by the inner portions of the flame from reaching the tubes. Another row of units may extend across the back of the furnace, although preferably this is far enough from the burners so that flame does not play directly upon them. It will be understood that although only three rows of tubes are shown, as many might be used as required to secure the desired output for any particular installation.

The effect upon temperatures in the combustion space resulting from the use of tubes arranged in lanes therein, in the indicated manner, as compared with conditions in an open combustion space having water wall tubes around the outer margins only, is indicated in Figure 8. The line designated "Conventional" indicates typical temperature conditions obtaining in the combustion space of an ordinary boiler, the ordinate line of the graph representing a section across the combustion space. "W" represents the water wall tubes which line the sidewalls of the combustion space, and temperature in degrees is also plotted upon the abscissa. It will be seen that where only water walls are used, that is, where water wall tubes comprise the only means for absorbing radiant heat directly from the combustion space, the temperature, while considerably reduced at the water walls, rises sharply toward the inner portions of the space and is relatively uniform and unaffected by the water walls, in the inner portions. When, on the other hand, lanes of heat absorbing elements are disposed at intervals across the combustion space, as indicated at "L," the temperature conditions are changed, and become more like those indicated by the dot-dash line designated "With interposed tube lanes." It will be seen that while the spacing of the tubes, and their heat absorbing capacity, are such as to reduce considerably the combustion space temperature throughout, the temperature is not reduced so far as to cause incomplete combustion.

The feed water is supplied to the headers 20 through an economizer, generally designated 25, comprising a plurality of sinuously coiled tube assemblies arranged in the flue 20 behind baffle 22 and adapted to absorb heat from the gases passing through such passage on their way to the stack. The water supply pipe 33 extends transversely of the back of the furnace, serving as an inlet header, and is directly connected to the several independent vertically disposed sinuous coils.

Fuel is supplied to the oil burners 45 through oil feed conduits 46, and air for combustion is delivered through a passage 47 under the combustion chamber, the air inlet 48 being at the back of the furnace. The air is passed through a preheater 50, and so absorbs heat from the flue gases before the latter are delivered to the stack 55.

The generating units are proportioned so that all of the water stands in the tubes 12 within the combustion chamber, only saturated steam being delivered from such tubes to the top header section.

The tubes 12, 15, 16 are of course properly proportioned as to size, and the heat paths through their various parts are calculated so that the rate of heat absorption by the water in tube 12 is sufficient to protect all parts of the tubes 15, 16, yet is insufficient to prevent proper superheating. Since the portions of the tubes 15, 16 fitted into the channels in the central tubes 12 are not welded thereto, direct heat absorption through the interfitted walls, and desuperheating of the downflowing steam by the water, are virtually prevented.

The operation of the boiler is controlled by regulating the admission of feed water to tubes 12. This may be effected automatically by a thermostatically controlled valve 37 in the feed water supply line. The valve is shown as a sleeve, provided with a plurality of orifices, 37' arranged to control the individual water feed pipes, $37^2$ leading from the several sections of the economizer to the bottom header. The valve is turned, to operate the same, by thermostatically controlled motor means, generally designated 27, which functions in response to changes of output steam temperature. When the temperature rises, the thermostat 27' tends to open the valve and cause the water level in the generating units to rise, reducing the temperature of the superheated steam and tending to maintain constant output. Conversely when the temperature tends to fall, thermostatic action tends to close the valve, reduce the water level and increase superheated steam temperature.

The steam pipe 105 through which the superheated steam from the boiler is delivered to the desired apparatus (unshown) is preferably provided with a pressure controlled valve 107 so arranged that in event an extreme demand upon the boiler should cause the pressure to drop unduly, the valve would function to close off the steam pipe sufficiently to maintain a constant minimum pressure and so prevent such excessive demand from reducing the water level in the central tubes 12. The valve is urged toward closed position by a spring 108 acting upon a piston 110 connected to the valve and arranged in a cylinder 112, the side of the cylinder upon the opposite side of the piston being connected to the boiler output by means of a pipe 115. The arrangement is such that boiler pressure tends to keep the valve open, while the spring tends to close the valve. The boiler pressure is sufficient to maintain the valve fully open except in the event of unduly severe demand such as might upset the operation and the automatic feed water controlling and superheating action previously described. Any such demand, reducing the pressure unduly, allows the spring to close the valve sufficiently to allow the pressure to again build up in the generating-superheating units, a predetermined minimum pressure being thus automatically and constantly maintained.

In the modified construction shown in Figures 9, 10, and 11 the boiler, the setting of which is generally designated 10A, is arranged to burn powdered coal, the feeders being designated 45A and the air ducts 47A.

The generating-superheating units are similarly disposed in rows spaced approximately four feet from each other across the boiler setting in planes parallel to the direction of flame travel, as best shown in Figure 10. An endless conveyor 70 is arranged at the bottom of the combustion chamber in such manner that ash precipitated thereupon is carried to a pit 72. Inasmuch as the arrangement of the headers and the connection of the various tubes thereto are similar to equivalent parts of the embodiment already described, no detailed description will be given except of those parts which differ in material respects.

Across the back of the combustion chamber the units are arranged in a somewhat different manner to provide a slag screen. Although the component conduit portions 12A, 16A are similar, and are connected to top and bottom headers in like fashion, the units are grouped in spaced, partly circular and oppositely facing arrangement, the units of each group being spaced upon close centers in such manner as to restrict gas flow therethrough, or at least to insure relatively close engagement between the gases and the generating units. The spacing of the groups will be seen to be insufficient to cause any undue pressure rise, and their tendency is to reverse the direction of flow of the gases which impinge thereagainst. The slag is thus removed by an inertia separation process. The slag screen tubes, designated 80, will be seen to be arranged directly over the ash pit, the bottom headers which project across the pit being covered by a refractory or other suitable covering 82, having sloping sides which serve to guide the slag into the pit.

The economizer 25A will be seen to be formed in two sections, one located in the flue 50A and the other between the flue and baffle 22A.

Figure 12:
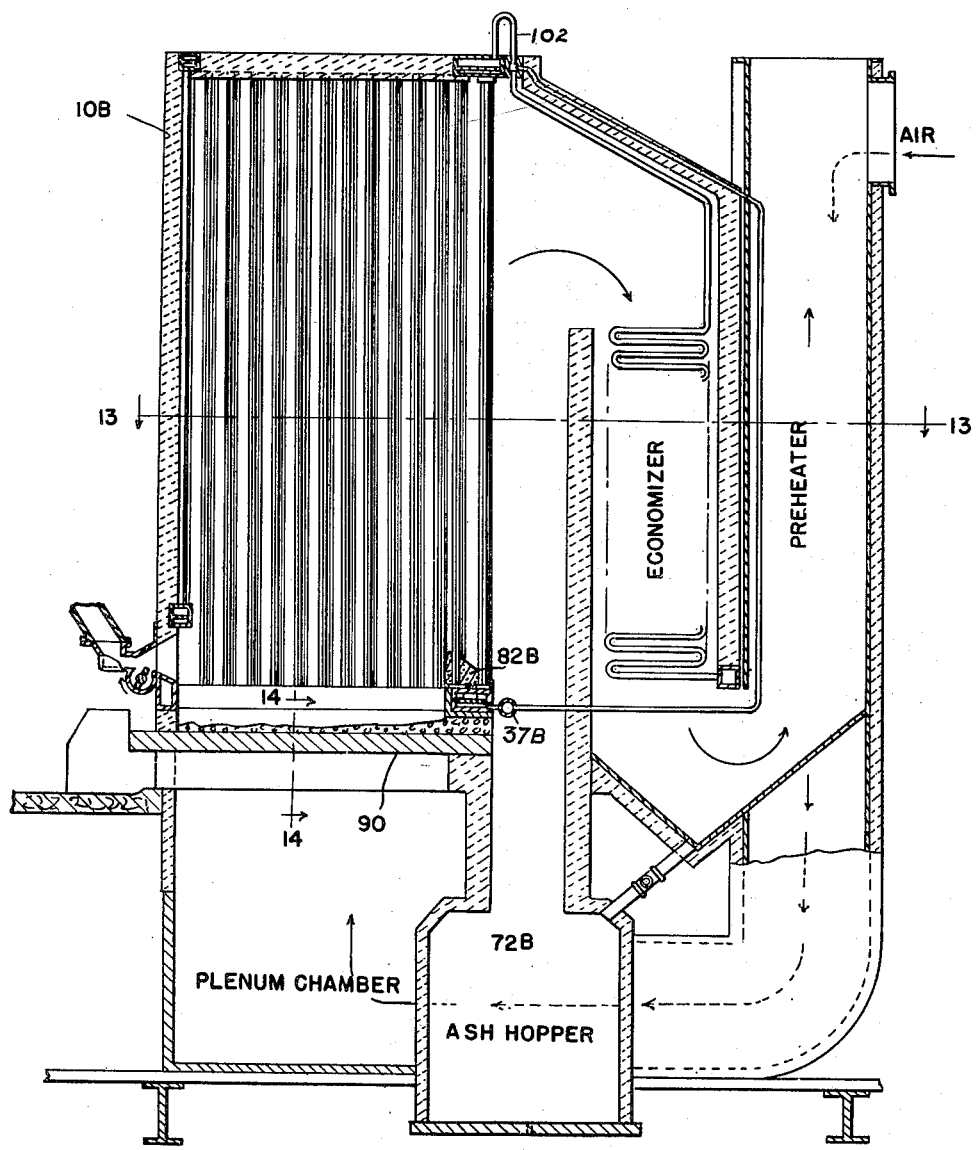
Figure 12 is a view similar to Figure 1 showing another modification.
Figure 13:
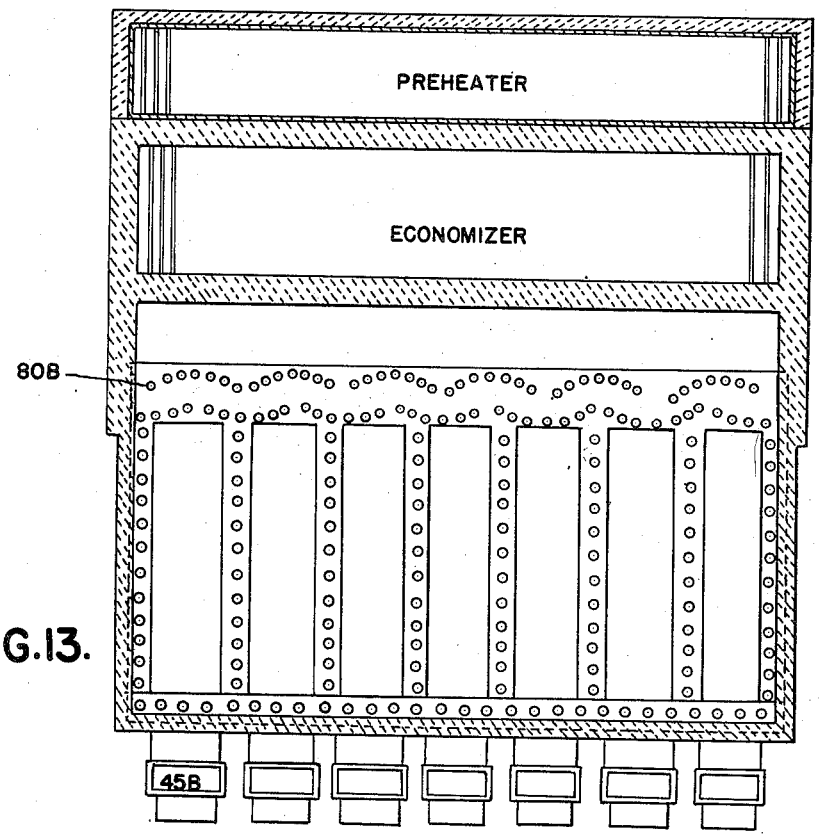
Figure 13 is a horizontal sectional plan view thereof taken substantially on the line 13—13 of Figure 12, and looking in the direction of the arrows.
Figure 14:
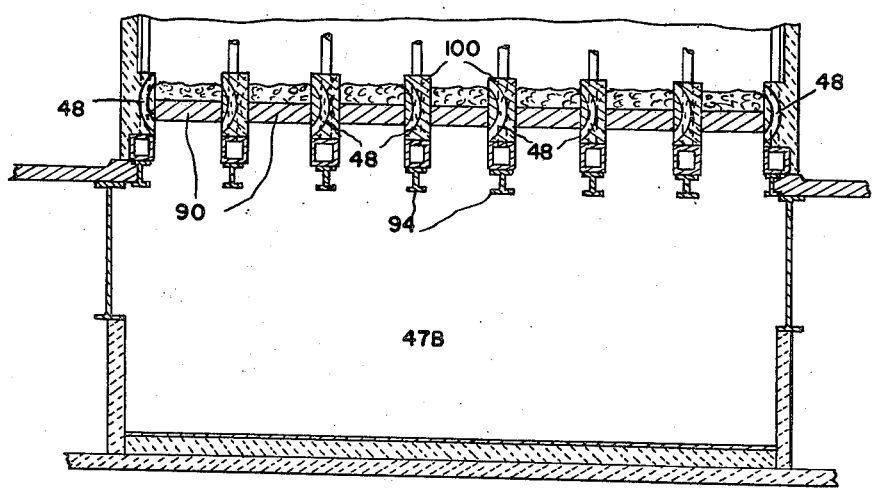
Figure 14 is a fragmentary vertical sectional view taken substantially on the line 14—14 of Figure 12, and looking in the direction of the arrows.

In Figures 12, 13 and 14 another modified construction is shown, a somewhat wider boiler setting 10B being indicated, having a plurality of lanes of similar combined generating and superheating units spaced in accordance with the principles above set forth to secure the maximum radiant heat absorption without undue cooling. A plurality of sprinkler-type stoker units 45B are provided, one to serve the space between each pair of tube lanes, and individual grates 90 may also be provided for each section thus defined.

Each tube lane is supported from beneath by an I-beam 94 extending from front to back across the plenum chamber, the header assembly resting directly upon such beam. The tube units are also protected to a height somewhat higher than the normal level of the fire bed by refractory dividing walls 100 which serve to separate the several grates and fire beds. Air passages 48 extend upwardly through the dividing walls, 100, to connect the plenum chamber with the space in the combustion chamber directly above the fire, thus allowing the delivery of air from the plenum chamber directly over the fire. The air channels 48 may be regulable as to size and are provided in such numbers and arrangement as to deliver over fire air in the most advantageous manner. The arrangement will be seen to permit delivery of air over the fire in uniform quantities, even in a furnace having a very large grate area.

The back row, designated 80B, comprises a plurality of grouped, closely spaced tubes affording a slag screen similar in its arrangement and operation to that incorporated in the embodiment last described. An inclined shield 82B is so arranged over the bottom header of the slag screen tubes as to cause the slag to fall in the ash hopper 72B.

It will be noted that the disclosed combined boiler and superheater structures of the present invention are of the positive pressure type, yet it is not necessary, as is now the case with positive pressure boilers of the varieties generally known, to use tubes of such devious contours. The tubes employed, in accordance with the present invention, are straight and easily cleanable, as distinguished from the devious and virtually uncleanable tubes used in known positive pressure boilers. While the operation of my improved apparatus in forming superheated steam is of the continuous or "straight through" variety, the water and steam in the central tubes travels at relatively low velocity during the formation of saturated steam, while the total area of the three tubes (15, etc.) constituting the first pass of the superheater is considerably less than the area of the central tube, so that the velocity is increased during this stage (for this reason as well as by reason of the expansion of the steam). The area of the four tubes (16, etc.) constituting the second pass of the superheater is also less than the area of the central tube, and the steam being in addition still further expanded, the velocity is also high in the second pass. It will be understood, of course, that the number of passes is subject to variation in accordance with the engineering problem presented by the particular installation, and that the disposition of the tubes used and the passage of the steam therethrough may be changed by the engineer in accordance therewith.

As also indicated in Figure 12, a by-pass 102 for saturated steam may be provided, connecting the economizer outlet header with the saturated steam section of one of the upper headers of the boiler. The by-pass is arched upwardly in such manner that water tends to remain in the economizer and flow downwardly through the throttle valve 37B and into the lower ends of the central water tubes in the described manner.

I am aware that the invention may be embodied in other specific forms without departing from the spirit or essential attributes thereof, and I therefore desire the present embodiments to be considered in all respects as illustrative and not restrictive; reference being had to the appended claims rather than to the foregoing description to indicate the scope of the invention.

I claim:

1. A radiant flash boiler and superheater construction comprising in combination with a boiler setting enclosing a combustion space defining a zone of radiant heating, heat-absorbing channel elements extending through said zone of radiant heating at an angle to the horizontal, comprising at least one water channel element and at least two superheating channel elements, said superheating channel elements being in intimate heat-conductive connection throughout substantially their entire heat absorbing length with said water channel element, means for feeding water to the bottom of said water channel element, means for controllingly reducing the admission of such water below the full evaporating capacity of said water channel element, whereby an effective water level may be established therein, means for withdrawing from the top of said water channel element steam generated therein and for transferring said steam therefrom to the top of one of said superheating channel elements, means for transferring the steam from the bottom of said last mentioned superheating channel element to the lower end of the other superheating channel element, and means for withdrawing superheated steam from the top of said last mentioned superheating channel element.

2. Means as set forth in claim 1 including a plurality of assemblies of superheating and water channel elements arranged as defined, and in which said means for feeding water, transferring steam and withdrawing superheated steam comprises upper and lower sectional header means, the lower header means having a water feeding section connected to the water channel elements of said assemblies and adapted to be connected to a source of feed water supply, said lower header means also having a transfer section connected to both of said superheating channel elements of each of said assemblies, and the upper header means having a transfer section connected to said water channel elements and to one of said superheating channel elements of each assembly, and having an offtake section connected to the other of said superheating channel elements of each assembly.

3. In combination with a flash boiler and superheater construction as defined in claim 1, an economizer arranged between said water channel element and the source of water supply, said means for controllingly reducing the admission of water comprising a throttle valve arranged between the economizer and said water channel element.

4. Steam generating apparatus comprising a radiant heat absorbing boiler and an economizer arranged below the same and adapted to be connected to a source of feed water supply, means connecting the economizer to the boiler at a level substantially at the top of the economizer and substantially at the bottom of the boiler, said connecting means being arranged to permit a continuous rise of steam from the economizer to the boiler.

5. In combination with a fluid supply source, a combustion chamber and a source of radiant heat, vaporizing and superheating means for the fluid comprising a plurality of multi-tube elements arranged at an angle to the horizontal within the zone of radiant heating, each element comprising metallically integral fluid and superheating tubes, fluid supply headers connected to some of the tubes and vapor transfer headers connected to the remainder of the tubes at one end of said elements, transfer headers connected to some of the tubes and offtake header means connected to the remainder of the tubes at other ends of said elements, and regulable means for supplying fluid to the lower ends of said fluid tubes at a rate not exceeding the rate of vaporization.

6. A superheating flash boiler, comprising in combination with a water supply source, a combustion chamber and a source of radiant heat, a plurality of saturated steam generating portions spaced from each other and disposed at an angle to the horizontal within the zone of radiant heating, regulable means for supplying water to the lower ends of said generating portions at a rate substantially conforming to the rate of vaporization, whereby a level within the zone of heating may be maintained within said portions, a plurality of superheating conduits grouped around each generating portion and metallically integrated therewith, the total capacity of the superheating conduits grouped about each generating portion being proportioned to the generating capacity of such portion, the heat paths throughout the integrated assembly of generating portion and superheating conduits being such that water contained in the generating portion may absorb heat from all portions of the superheating conduits with sufficient rapidity to prevent the latter from burning out when empty of steam, such rate of heat absorption being insufficient to prevent a desired degree of superheating during passage of steam through said superheating conduits.

7. A continuous flow flash boiler of the class described having in combination with feed water supply means, serially connected saturated steam generating and superheating portions, a steam delivery portion connected to the latter, means for throttling the feed water supply in response to steam delivery temperature, valving means connected to the steam delivery portion whereby the delivery of steam may be curtailed, means tending to close said valving means when the pressure in said delivery portion falls below a predetermined value, and means tending to open said valving means, and maintain it open, when said pressure exceeds said value.

8. Means as set forth in claim 1 in which said means for controllingly reducing the admission of feed water comprises a throttle valve, and means responsive to the temperature of the superheated steam for moving said valve toward open position in response to a rise of superheated steam temperature, and for moving said valve toward closed position in response to a rise of superheated steam temperature, and for moving said valve toward closed position in response to a fall of superheated steam temperature.

9. Means as set forth in claim 5 in which said regulable means for supplying fluid to the lower ends of the fluid tubes comprises a throttle valve, and means responsive to the temperature of the superheated steam for actuating said throttle valve.

10. Means as set forth in claim 5 in which each of said headers is formed from a main header divided into upper and lower sections, one section of each main header comprising a transfer section, the other section of one main header comprising a feed water supply section, and the other section of the other main header comprising an offtake section.

CHARLES S. TURNER.